March 23, 1926.  
J. R. GAMMETER  
ROTARY CUTTER  
Filed May 25, 1922  
1,577,620  
2 Sheets-Sheet 1

Inventor  
John R. Gammeter  
By Robert M. Pierson  
Atty.

March 23, 1926. 1,577,620
J. R. GAMMETER
ROTARY CUTTER
Filed May 25, 1922 2 Sheets-Sheet 2
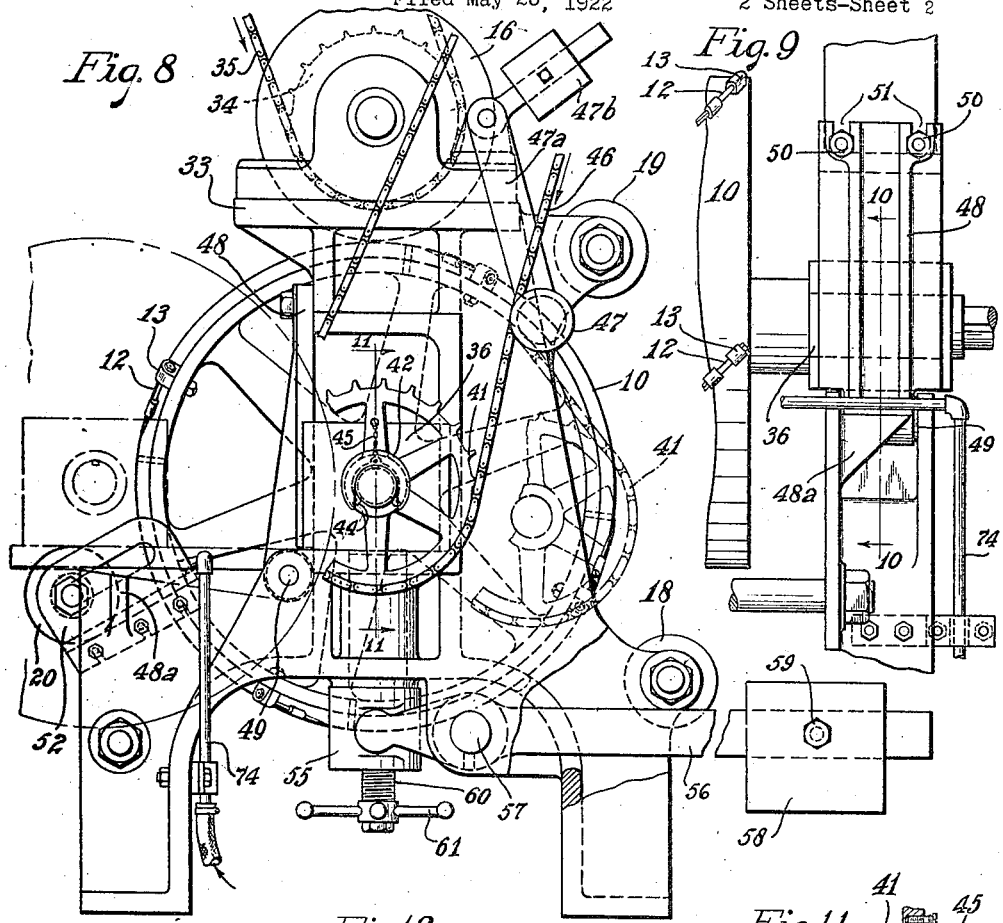
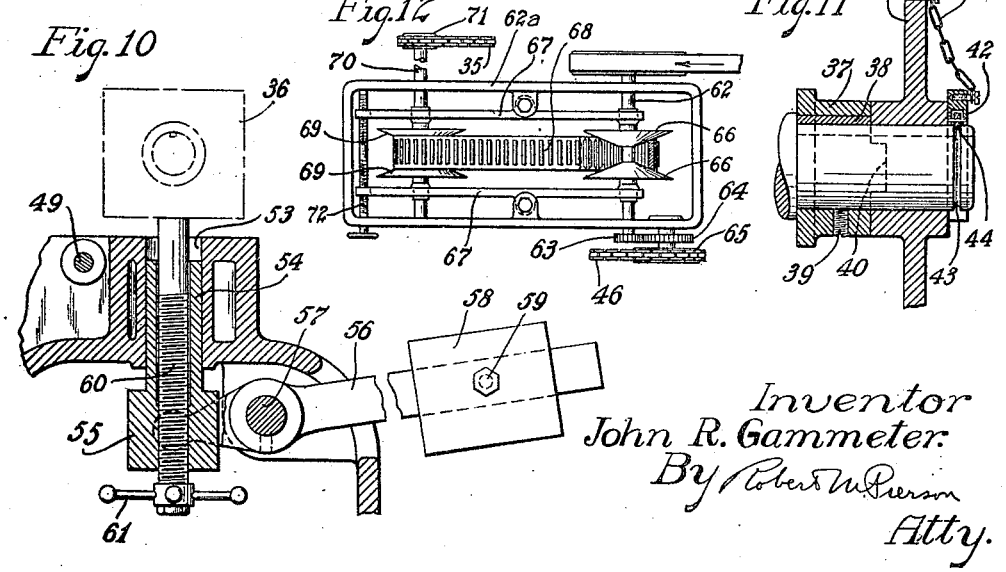
Inventor
John R. Gammeter
By Robert M. Pierson
Atty.

Patented Mar. 23, 1926.

1,577,620.

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

ROTARY CUTTER.

Application filed May 25, 1922. Serial No. 563,570.

*To all whom it may concern:*

Be it known that I, JOHN R. GAMMETER, a citizen of the United States, residing at Akron, in the county of Summit and State of Ohio, have invented a certain new and useful Rotary Cutter, of which the following is a specification.

This invention relates to rotary cutters and more especially to cutters of this character adapted to cut a sheet of material on the bias, as in the preparation of rubberized fabric for the manufacture of pneumatic tires, wherein the cutting element comprises a flexible knife or strip of metal wound helically upon the surface of a drum, the present invention being an improvement upon that of my copending application Serial No. 474,320, filed June 2, 1921.

My general object is to provide an improved rotary cutter of economical construction adapted for rapid and accurate work. A more specific object is to provide a cutter wherein a metal strip or knife having a plurality of cutting edges may be used, and changed in position after each edge is dulled so as to bring another edge into use. Another specific object is to provide an improved, resilient mounting for such a knife which will hold the knife accurately in place without dulling its edges that are not at the time functioning as cutting edges, and will avoid buckling of the knife. Further objects are to avoid upsetting or overturning forces upon a knife of the kind referred to, to assure the proper separation of the work from the cutting drum after the work is cut, and to provide a machine readily adaptable to cut the work to different forms or sizes.

Of the accompanying drawings:

Fig. 8 is an elevation of a part of the machine as viewed from the end of the cutting drum.

Fig. 9 is an elevation of an end portion of the drum and its journal mounting, as viewed from the left of Fig. 8.

Fig. 10 is a section on line 10—10 of Fig. 9.

Fig. 11 is a section on line 11—11 of Fig. 8.

Fig. 12 is a plan view of a variable-speed driving device, on a small scale.

Figure 1:
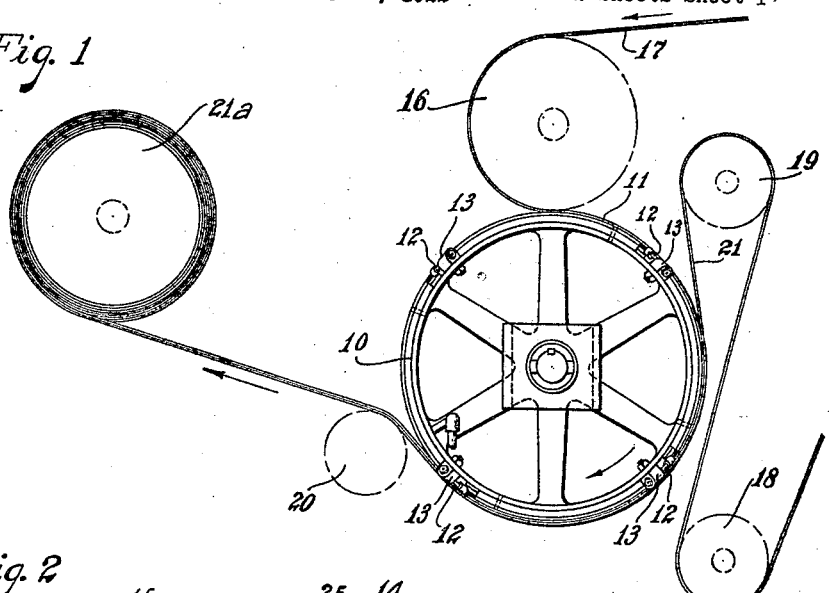
Fig. 1 is a diagrammatic end view of a rotary cutting drum and certain elements associated therewith, illustrating the use of my improvements.

In the drawings, 10 is a rotary, cylindrical drum on which are helically wound a plurality of flexible strips of metal or knives 11, of triangular cross-section, said knives being fastened at their ends, by adjustable anchor-bolts 12, 12, to bracket-like anchoring members 13, 13 secured on the respective ends of the drum. 14, 14 are helical strips of rubber or cushions constituting a resilient cover for said drum between said knives, for holding the work in substantially circular form between the knives so that deformation of the fabric is avoided and an accurate operation obtained. 15, 15 are strips of nonsticking fabric overlying said cushions to avoid adhesion of the work to the drum.

In Fig. 1, 16 is a hard-surfaced roll, preferably of metal, against which roll the knives 11 are adapted to cut the rubberized fabric 17 which constitutes the work, the latter passing partly around said roll to the cutting position, and being pressed against said roll adjacent and between the successive knives by the cushions 14. 18, 19, 20 are guide rolls, over which a liner 21, from any convenient source (not shown) is adapted to pass, being guided thereby partly around the cutting drum 10, as shown, and to a liner and stock rewinding roll 21ª, said liner carrying with it from the cutting drum 10 the bias-cut strips of fabric as cut by the knives 10 acting against the hard roll 16, the liner and said strips being interwound together upon the roll 21ª. The liner and stock rewinding roll 21ª may be provided with any suitable friction driving means (not shown) so as to receive the liner and work as fast as they are given off by the drum 10, notwithstanding the changing size of the body of liner and stock wound thereon.

The drum 10 is of such size with respect to the angle at which the knives 11 lie thereon that the hard roll 16 will pass off of the last end of each knife before it again contacts the leading end of the same knife, so that it at no time bears upon more than one part of the same knife. I thereby avoid such buckling of the middle portion of the knife away from the drum as is likely to occur if the knife is given more than one complete turn about the drum and is thus in position to have two parts of it in contact with the roll 16 at the same time.

Figure 2:
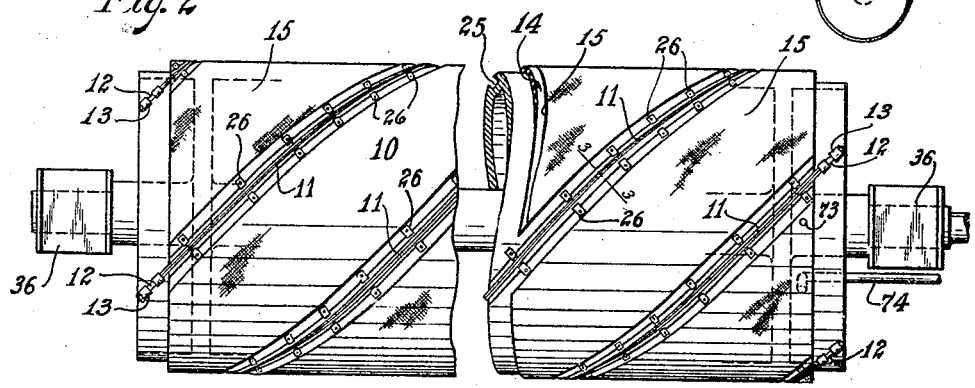
Fig. 2 is a side elevation, with parts broken away, of a cutting drum embodying a preferred form of my invention.
Figure 3:
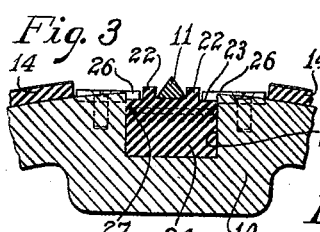
Fig. 3 is a transverse section through a part of the drum and a knife mounting and knife thereon, on line 3—3 of Fig. 2.
Figure 4:
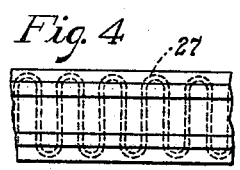
Fig. 4 is a plan view of a part of the knife-mounting shown in Fig. 3.

In the preferred embodiment shown in Figs. 2, 3 and 4, the knife 11 is of equilateral, triangular cross-section, and is seated between flanges 22, 22 upon the outer surface of a strip of hard rubber 23 vulcanized to an underlying strip of soft rubber 24, said strips having side faces substantially radial to the drum 10 and being seated in a groove 25, of corresponding shape, in the drum, so as to constitute a resilient backing strip for the knife. Said backing strip is held in the groove 25, preferably under compression, by plates 26, 26 screwed to the outer face of the drum 10.

The hard rubber strip 23 is reinforced by a looped wire 27 embedded and vulcanized therein, the sinuous form of said reinforcement permitting the free bending of the knife-backing strip about the drum while strengthening it laterally. The knife 11, being of equilateral, triangular cross-section, may be turned to bring a new cutting edge into position when one has become worn, and will fit snugly between the flanges 22, 22 in either position, seating upon one of its flat sides. The backing strip may be constantly held under substantial compression by the plates 26, so as to offer sufficient resistance to force the knife through the work without excessive movement of the knife radially inward with respect to the drum, although yielding sufficiently to insure proper contact of all parts of the knife with the hard roll 16.

Figure 5:
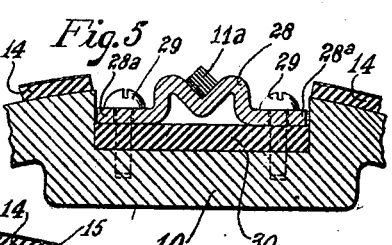
Fig. 5 is a section corresponding to Fig. 3 but showing a modification.

In the modification shown in Fig. 5, a knife 11ª of square cross-section is seated in cutting position on a metal strip 28 of bridge-like or arched form in cross-section, said strip being formed with a V-groove in its outer surface adapted to fit two sides of the square knife so as to hold it with one edge outward, in cutting position. The legs 28ª, 28ª of the arch are turned outward and formed with perforations in which are slidably mounted screws 29, 29 passing through a cushion 30, of soft rubber, underlying the metal strip 28, said screws being threaded into the body of the drum 10, so that said metal strip may slide on said screws, the pressure on the knife being resisted by the rubber cushion 30. The arched form of said strip may be adapted to provide resilience in addition to that of the cushion 30. It affords a good seat for the knife, preventing lateral displacement or rolling of the latter, and may be economically constructed, as by stamping or rolling a strip of sheet metal.

Figure 6:
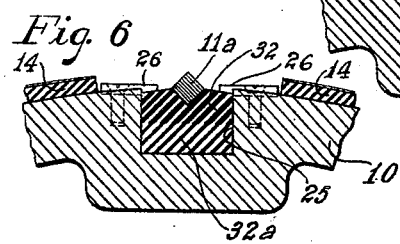
Fig. 6 is a similar section showing another modification.

In the modification shown in Fig. 6, the knife-backing strip comprises an outer hard rubber strip 32 vulcanized to an inner soft rubber strip 32ª, and secured in the groove 25 by the plates 26, the construction being similar to that of the form shown in Fig. 3, except that the square knife 11ª is used, the hard rubber strip 32 being appropriately grooved to receive it.

Figure 7:
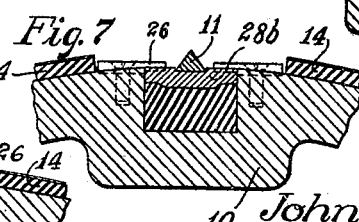
Fig. 7 is a similar section showing another modification.

The modification shown in Fig. 7 is substantially like the form shown in Fig. 3, except that a metal strip 28ᵇ is substituted for the hard rubber strip 23.

It is highly desirable, in the use of knives such as those described, that means for rapidly changing drums without danger of injury to the knives be provided, that an even pressure be maintained between the drum and the hard roll, and the drum 10 and hard roll 16 both be driven, and at the same peripheral speed, in order that the knives may not be overturned, laterally displaced, or dulled, by relative movement between the knife and the surface of the hard roll with which it contacts. In order that they may be so driven, as well as to obtain the other advantages mentioned, I prefer to mount them as shown in Figs. 8 to 12, wherein 33 is the nearer of a pair of end standards for the hard roll 16, the drum 10, and the liner guiding rolls 18, 19, 20. The hard roll 16 is journaled in a fixed position at the top of said standards and one of its trunnions is provided with a sprocket 34 secured thereon and adapted to be driven by a chain 35.

Upon a reduced portion of each trunnion of the drum 10 is mounted a journal block 36, one of which, at the driving end of the roll, is retained thereon by a jaw clutch member 37 non-rotatably secured on a further reduced portion of the trunnion by a key 38 and a set screw 39 (Fig. 11), said clutch member being adapted to interlock, as indicated at 40, at its outer side, with the hub of a sprocket 41 mounted upon the end portion of the trunnion and detachably retained thereon in interlocked engagement with the clutch member 37 by a U-shaped spring-clip or clasp 42 adapted to be sprung onto the end of said trunnion, the latter being formed with a circumferential groove 43 to receive the spring or tongue 44 of said clasp. The rear journal block may be retained on its trunnion by any suitable means (not shown). 45 is a chain connecting said clasp with the sprocket 41, to support the clasp within easy reach when it has been slipped off the trunnion in changing drums. 46 is a sprocket chain for driving the sprocket 41 of the drum 10. 47 is a guide roller for said chain, journaled on the end of a pivoted arm 47$^a$ impelled by an adjustable weight 47$^b$, said roller thus being adapted to act as a chain tightener and also to cause the chain to support the sprocket 41 in the position shown in dotted lines in Fig. 8 when said sprocket is removed from the trunnion in the changing of drums, as will presently be described.

Each of the journal blocks 36 of the drum 10 is removably mounted in a vertical guide way in one of the end standards 33, one vertical side of said guide-way being formed by a gate 48 pivoted at its lower end to the standard 33, as indicated at 49, and adapted to be retained in an upright position by nuts 50, 50, on stud bolts projecting from said standard through slots 51, 51 in said gate, or to be turned about its pivot 49 to a horizontal position, as indicated in dot-and-dash lines in Fig. 8, where it rests on a bracket-like projection 48$^a$ from the standard. When so opened, said gate is adapted to permit the removal of the drum 10, with the journal blocks 36 remaining on the trunnions thereof, from said end standards, and to afford a trackway for said blocks in this operation.

The liner-guiding roll 20 has its axle-ends adjustably mounted in quickly detachable brackets, one of which is shown at 52 (Fig. 8), secured to the end standards 33, so that said roll may readily be removed to permit the removal of the drum 10 and the substitution of another drum of the same or a different size, and may be adjusted from or toward the drum so as to determine the point at which the work will leave the latter.

For supporting each of the journal blocks 36 in their vertical guideways and pressing the drum 10, with a uniform, adjustable pressure, toward the hard roll 16, each of the end standards 33 is formed, directly below the guideway, with a vertical guide-aperture 53 (Fig. 10), in which is slidably mounted a sleeve 54 having an enlarged, internally threaded lower end portion 55 adapted to be engaged and urged upward by the forked end of a lever 56 pivoted on the standard at 57, and having a weight 58 slidably mounted on its opposite end portion, said weight being adapted to be secured in adjusted positions on said lever by a set screw 59. 60 is a bolt threaded through the enlarged end portion 55 of the sleeve 54, extending upward through the latter, and adapted to support the journal block 36. 61 is a hand wheel secured to the lower end of said bolt, for varying its position in the sleeve 54, so that the lever 56 may act in a substantially horizontal position although drums of different size be used, and so that the force of the weight 58 as applied to the drum may be at its maximum for a given setting of said weight, and substantially constant notwithstanding irregularities in the form of the drum.

For driving the hard roll 16 and the drum 10 at the same peripheral speed, their respective sprocket chains 35 and 46 extend to a variable speed device such as is shown in Fig. 12, where 62 is a drive shaft journaled in a frame 62$^a$ and adapted through gears 63, 64 to drive a sprocket 65 upon which the chain 46 is mounted. 66, 66 are a pair of conical pulleys slidably and non-rotatably mounted upon said shaft and adapted to be moved from and toward each other, by levers 67, 67, pivoted on the frame 62$^a$, to vary their effective diameter. 68 is a drive belt mounted thereon and on a pair of conical pulleys 69, 69, the latter being slidably and non-rotatably mounted upon a shaft 70, on which is secured a sprocket 71 for the chain 35. Said pulleys 69, 69 are adapted to be moved from and toward each other by the levers 67, to vary their effective diameter in inverse relation to variations in that of the pulleys 66, so as to keep the belt 66 taut while varying the relative angular speeds of the roll 16 and the drum 10. 72 is a right and left threaded screw journaled in the frame 62$^a$ and adapted to actuate the levers 67 to move the pulleys 66 and the pulleys 69 oppositely upon their shafts.

For assuring the timely separation of the bias-cut strips of stock from the knives 11 and the drum 10, so that they will flatly and accurately lie in position upon the liner 21, to be carried thereby onto the rewinding roll 21$^a$, the drum 10, and the rubber strips 14 and fabric strips 15 thereon, may be formed with a radial aperture 73 at a point underlying the leading corner of each piece of the work, and an open-ended or nozzled compressed-air pipe 74, leading from a source of compressed air (not shown) may be supported in position to register with said apertures successively as the drum revolves, so as to blow the leading corner of each piece of stock from the drum at a point adjacent the position at which the liner 21 leaves said drum.

In the operation of the apparatus, assuming that bias strips of fabric are to be cut of different widths from those last cut, the bolts 60 are turned to lower the journal blocks 36 onto the floors of their guide ways, the enlarged ends of the sleeves 54 sustaining the force of the weights 58, the gates 48 are opened, the clasp 42 and sprocket 41 are removed from the trunnion of the drum 10, the sprocket being permitted to hang in the chain 46 as indicated in dotted lines in Fig. 8, the brackets 52 with the guide roll 20 supported thereby are removed, and the drum 10 is withdrawn from the apparatus, its journal blocks 36 sliding on the gates 48 as indicated in dot-and-dash lines in Fig. 8. By a reversal of these operations, another drum of different size, or with the knives 11 differently spaced thereon, is mounted in the apparatus, the gates 48 are closed, the guide roll 20 remounted and adjusted, the sprocket 41 and clasp 42 mounted on the trunnion of the new drum, the bolts 60 set up to lift the new drum until one of its knives bears against the hard roll 16 and the levers 56 are forced to a substantially horizontal position, and the weights 58 on said levers may be adjusted to provide a suitable pressure between the drum 10 and roll 16.

If not previously attended to, the liner 21 is threaded about the guide rolls and drum as shown in Fig. 1 and started upon the liner rewinder roll 21ᵃ. The variable speed mechanism, shown in Fig. 12, is adjusted so as to give equal peripheral speeds to the roll 16 and drum 10. The stock 17 is then carried around the hard roll 16 and started between it and the drum 10 as power is applied through the shaft 62. The stock is then continuously fed and cut in bias strips by rotation of said roll and drum, and the cut strips are carried by the liner 21 from the drum 10 to the liner rewinding roll 21ᵃ and interwound with said liner on said roll. The leading portion of each piece of stock being dislodged from the drum by the jet of air from the pipe 74, the weight of the stock is sufficient to peel it from the drum throughout the rest of its area, and the pieces of stock are thus caused to lie accurately in order upon the liner 21 as the latter proceeds to the rewinding roll.

The work lies snugly and without wrinkles upon the hard roll 16, around which it passes to the cutting position, and the cushions 14 press it against said roll immediately at each side of the knife as the latter is forced into it, as well as throughout the space between successive knives, along the nip of the roll and drum, so that the knives, the cushions and the work all move together without wrinkling or buckling of the fabric under the action of the knives. The resiliency of the knife mountings and the cushions thus results in an accurate cutting of the stock, and this effect is also promoted by reason of the fact that the work passes partly around the roll 16 before reaching the knives, being held to true form by contact with said roll, this arrangement being such that the stock may pass onto said roll under substantial tension without such tension causing an excessive lateral pull upon the cutting edge of the knife. The liner 21 also assists in producing this effect by holding snugly against the drum the foremost part of the strip being cut.

Modifications may be resorted to without departing from the scope of my invention, and I do not wholly limit my claims to the specific construction shown.

I claim:

1. In a cutter for sheet material, the combination of a rotary drum, a flexible knife wound helically upon said drum, means for holding said knife under longitudinal tension upon said drum, a roll adapted to be pressed against said knife in face-to-edge contact, in a cutting action upon the work, and means independent of the contact of said roll with said knife for driving said drum and said roll at the same peripheral speed.

2. In a cutter for sheet material, the combination of a knife-holding drum, a flexible knife wound helically about said drum, a resilient backing member under said knife, a yielding, work-pressing member on said drum adjacent said knife and having a cylindrical outer face substantially flush with the cutting edge of said knife and a cylindrical roll adapted to coact with said drum in a rotary cutting action upon the work, said drum being of such size in respect to the angle at which said knife lies thereon that said roll passes from the last end portion of said knife before it again contacts the foremost end portion of said knife.

3. In a rotary cutter, the combination of a rotary, knife-holding drum, a set of knives mounted on said drum, cushion members under said knives, yielding work-supporting members mounted on said drum between said knives, the cutting edges of said knives and the outer surfaces of said members lying at approximately the same distance from the center of said drum, so as to hold the work in substantially true circular form, and a member adapted to coact with said drum in a cutting action by pressing the work against said knives.

4. In a rotary cutter for sheet material, the combination of a rotary, knife-holding drum, a knife mounted helically on said drum, a resilient backing for said knife, a roll adapted to coact with said drum in a cutting action by pressing the work against said knife, and a cushion member or cushion members on said drum adapted to press the work against said roll on both sides of the functioning portion of said knife and substantially throughout the nip of said roll and drum.

5. In a rotary cutter for sheet material, the combination of a rotary, knife-holding drum, a knife mounted on said drum, a roll adapted to coact with said drum in a cutting action by pressing the work against said knife, guiding means so associated with said roll as to cause it to receive the work at a part of its circumference remote from the cutting position, and a cushion member on said drum adapted to press the work against said roll adjacent said knife.

6. In a rotary cutter for sheet material, the combination of a rotary, knife-holding drum, a knife mounted helically on said drum, a cushion member mounted on said drum and having a cylindrical outer surface substantially flush with the cutting edge of said knife, a roll adapted to press the work against said knife and said cushion member, means for driving said drum and roll, and means for so guiding a liner as to cause it to pass partly around said drum in contact therewith to hold the work in position on said drum and subsequently to carry the work away from said drum.

7. In a cutter for sheet material, the combination of a knife-holding drum, a set of flexible knives wound helically about said drum, resilient backing members under said knives, a cylindrical roll adapted to coact with said drum in a rotary cutting action upon the work, said drum being of such size in respect to the angle at which said knives lie thereon that said roll passes from the last end portion of each knife before it again contacts the foremost end portion of said knife, and means independent of the contact of said roll with said knives for driving said roll and said drum at the same peripheral speed.

8. In a rotary cutter the combination of a drum, a set of flexible knives mounted obliquely thereon, means for holding said knives under longitudinal tension, yielding backing members for said knives on said drum, a roll adapted to press the work against said knives, and means for driving said roll and said drum at the same peripheral speed.

9. In a rotary cutter, the combination of an elongated, flexible cutting member formed with a plurality of cutting edges running longitudinally thereof, a drum constituting a mounting for said cutting member and adapted to seat the latter with one or another of its edges in cutting position, means for holding said cutting member under longitudinal tension upon said drum, a roll adapted to coact with said drum and the knife thereon in a rotary cutting action upon the work, and means for driving said roll and said drum at the same peripheral speed.

10. In a cutter for sheet material, the combination of an elongated cutting member, a mounting therefor comprising a hard backing-member formed with a surface adapted freely to receive and seat said cutting member and to hold it against lateral displacement, means for holding said cutting member under longitudinal tension upon said backing member, and a resilient backing-member for said hard backing-member.

11. In a cutter for sheet material, the combination of an elongated cutting member, a mounting therefor comprising a rigid member formed with a groove, a resilient backing member for said cutting member lying in said groove, and a hard backing member overlying said resilient member in said groove, said hard member being adapted to seat said cutting member and to hold it against lateral displacement.

12. In a cutter for sheet material, the combination of an elongated cutting member, a mounting therefor comprising a rigid member formed with a groove, a resilient backing-member for said cutting member lying in said groove, a hard backing-member overlying said resilient member in said groove, said hard member being adapted to seat said cutting member and to hold it against lateral displacement, and means for holding said backing-members under compression in said groove while permitting them to be further compressed by the cutting action.

13. In a cutter for sheet material, the combination of a flexible knife, a resilient backing therefor comprising a body of hard rubber adjacent the knife and a body of soft rubber underlying said hard rubber body, and a rigid member formed with a groove in which the backing members are seated, the hard rubber backing member being formed to interlock with the knife against lateral displacement of the latter.

14. In a cutter for sheet material, the combination of a knife, and a resilient backing therefor comprising a body of hard rubber adjacent the knife and a body of soft rubber underlying said hard rubber body, said hard rubber body and said soft rubber body being vulcanized together.

15. In a cutter for sheet material, the combination of a knife, and a resilient backing therefor, said backing comprising a body of hard rubber adjacent the knife, a metal reinforcement vulcanized in said hard rubber body, and a soft rubber body underlying said hard rubber body, the hard rubber portion of the backing being formed with a surface adapted freely to receive and to seat the knife and to interlock with it against lateral displacement.

16. A rotary cutter comprising a drum formed with a helical groove, a resilient knife-backing member lying in said groove, a hard knife-backing member overlying said resilient knife-backing-member in said groove, a long, flexible knife having a plurality of cutting edges running lengthwise thereof, said knife being wound helically about said drum so as to seat upon said hard backing-member, means for preventing lateral displacement of said knife, and means for anchoring the ends of said knife at the ends of the drum so as to hold said knife, by its longitudinal tension, against said hard backing-member.

17. In a rotary cutter, the combination of a drum formed with a helical groove, a resilient knife-backing member mounted in said groove, and a long, flexible knife wound helically about said drum, overlying said backing member, and means for pulling the ends of said knife so as to hold it against said backing member.

18. In a rotary cutter, the combination of a knife-holding drum, a knife mounted thereon, a roll adapted to press the work against said knife, and stationary means for directing a jet of air against said work at a determinate, localized part of the orbit of the drum to separate it from the drum.

19. In a rotary cutter for sheet material, the combination of a knife-holding drum, a set of knives wound helically thereon, a roll adapted to press said material against said knives, the latter being adapted to cut the material into bias strips, means for driving said drum, and stationary means for directing a jet of air against the successive strips at a determinate, localized part of the orbit of the drum as the drum is rotated to separate said strips from said drum.

20. In a rotary cutter for sheet material, the combination of a knife-holding drum, having its cylindrical wall formed with a perforation, a knife mounted on said drum, a roll adapted to press the work against said knife, means for driving said drum, and an air conduit having an opening in position to direct a jet of air periodically into said perforation as said drum is rotated.

21. In a rotary cutter, the combination of a knife-holding drum, a mounting therefor, quickly-releasable means for holding said drum in said mounting, a roll adapted to coact with said drum in a rotary cutting action, and a variable-speed driving mechanism operatively connecting said roll and said drum.

22. In a rotary cutter, the combination of a knife-holding drum, journal blocks for the same, end standards for said drum, said end standards being formed with vertical guideways for said journal blocks, means for yieldingly impelling said journal blocks in said guideways, and gate members forming vertical side walls of said guideways and adapted to be opened to permit the removal of said drum from said end standards.

23. In a rotary cutter, the combination of a knife-holding drum, journal blocks for the same, end-standards for said drum, said end-standards being formed with vertical guideways for said journal-blocks, means for yieldingly impelling said journal blocks in said guideways, a stop for said yielding means, means for adjusting the position of said journal-blocks with respect to said yielding means, and pivoted gate members forming vertical side walls of said guideways, said gate members being adapted to be opened out to permit the removal of said drum, with its journal blocks thereon, from said end standards, and to serve as supports for said journal blocks as the drum is withdrawn from said end-standards.

24. In a rotary cutter, the combination of a knife-holding drum, end standards therefor adapted for quick insertion and removal of said drum, a roll adapted to coact with said drum in a rotary cutting action, and a variable speed driving mechanism operatively connecting said roll and said drum, said mechanism including quick-acting means for making or breaking the connection between said roll and said drum.

25. In a cutter for sheet material, the combination of a knife-holding drum, a flexible knife wound helically about said drum, a yielding, work-pressing member on said drum adjacent said knife and having a cylindrical outer face substantially flush with the cutting edge of said knife, and a cylindrical roll adapted to coact with said drum in a rotary cutting action upon the work, said drum being of such size in respect to the angle at which said knife lies thereon that said roll passes from the last end portion of said knife before it again contacts the foremost end portion of said knife.

In witness whereof I have hereunto set my hand this 20 day of May, 1922.

JOHN R. GAMMETER.